Figure 1:
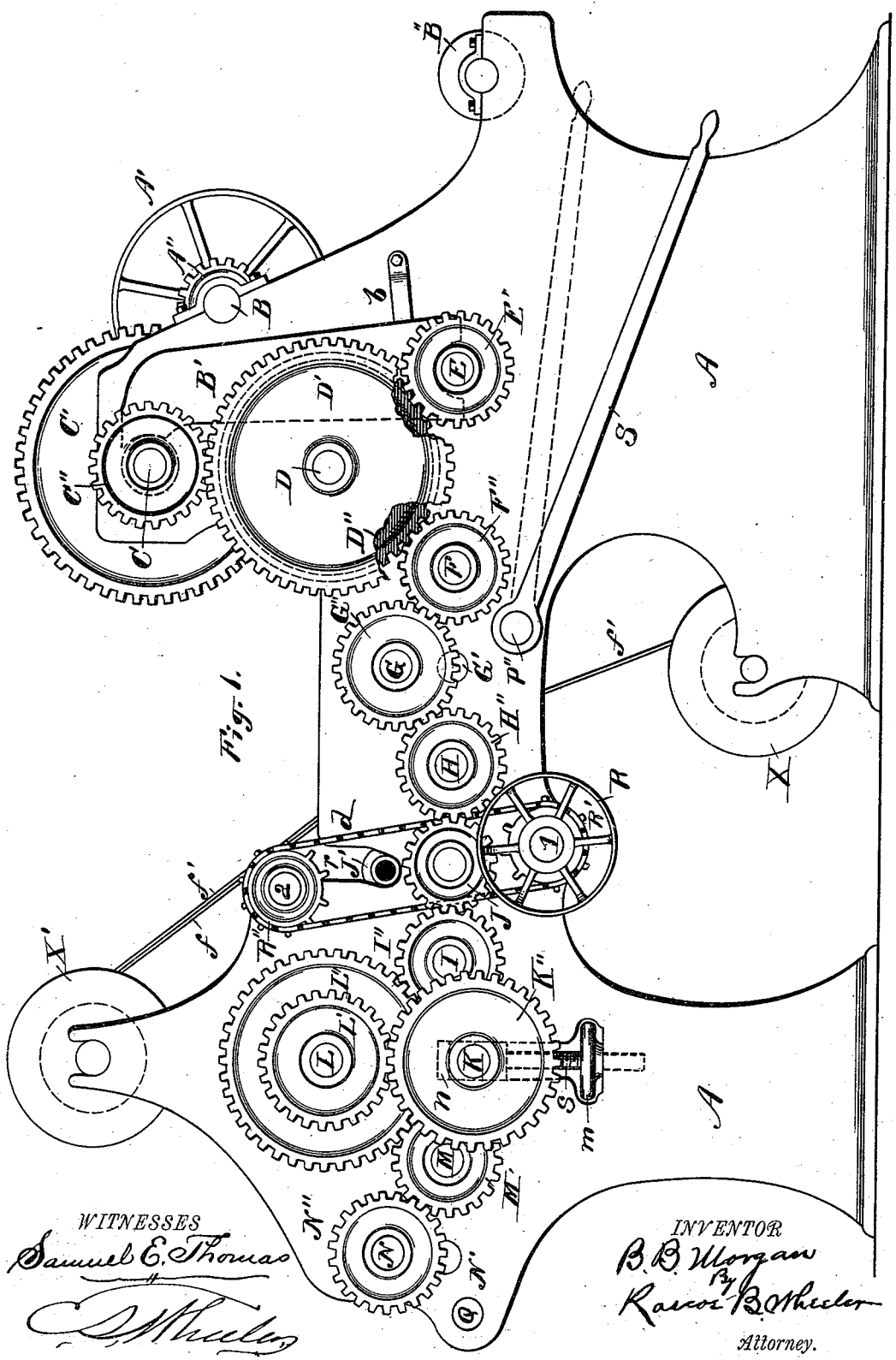

(No Model.) 4 Sheets—Sheet 1.

B. B. MORGAN.
MACHINE FOR MAKING GARMENT STAYS.

No. 438,855. Patented Oct. 21, 1890.

WITNESSES
Samuel E. Thomas

INVENTOR
B. B. Morgan
By
Roscoe B. Wheeler
Attorney.

(No Model.) 4 Sheets—Sheet 2.
B. B. MORGAN.
MACHINE FOR MAKING GARMENT STAYS.
No. 438,855. Patented Oct. 21, 1890.
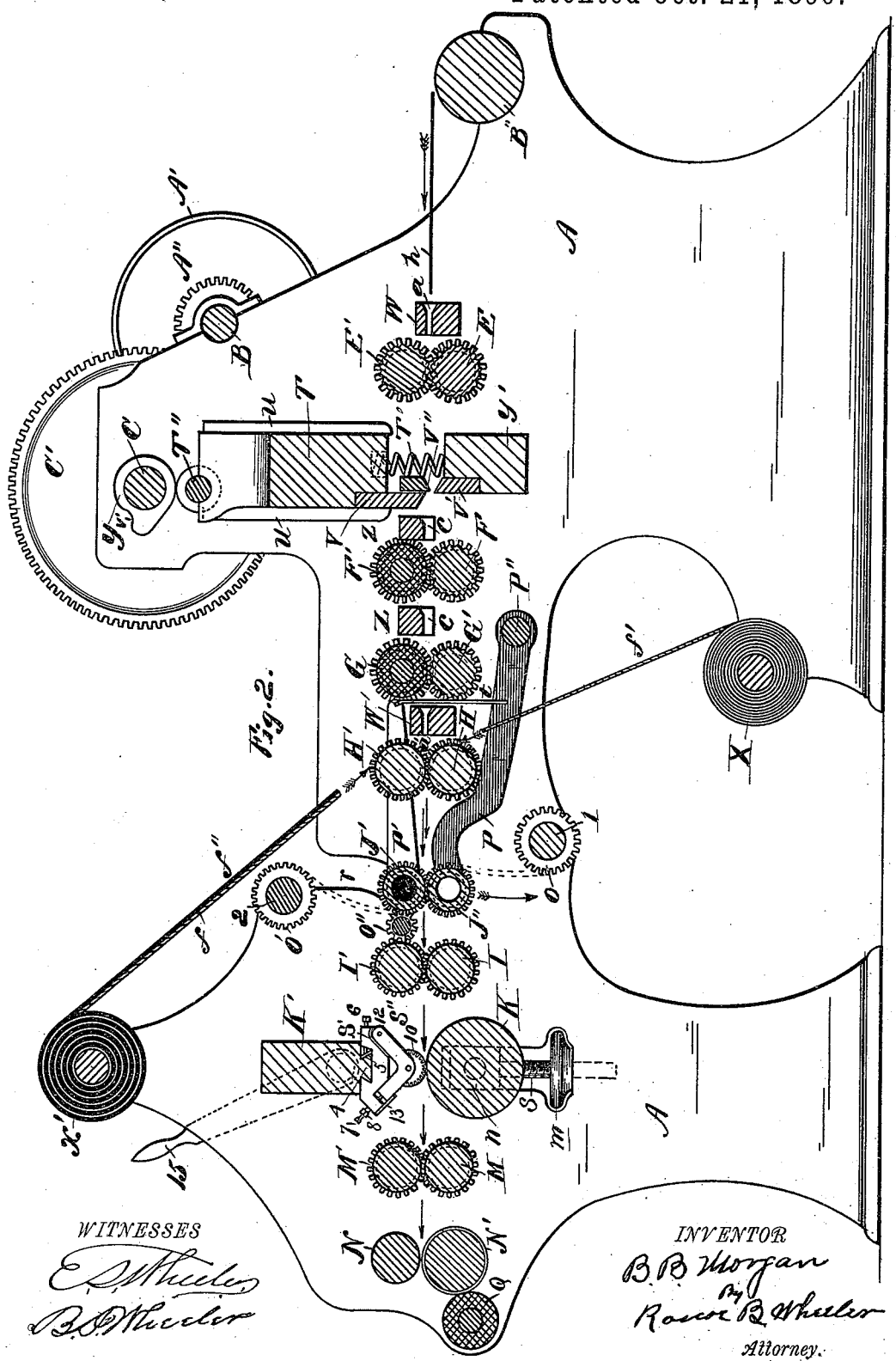
WITNESSES
INVENTOR
B. B. Morgan
By Roscoe B. Wheeler
Attorney.

(No Model.) 4 Sheets—Sheet 3.
B. B. MORGAN.
MACHINE FOR MAKING GARMENT STAYS.
No. 438,855. Patented Oct. 21, 1890.
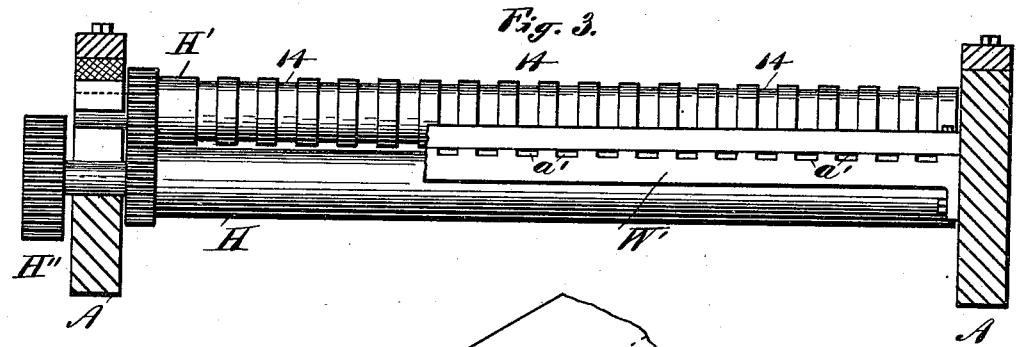
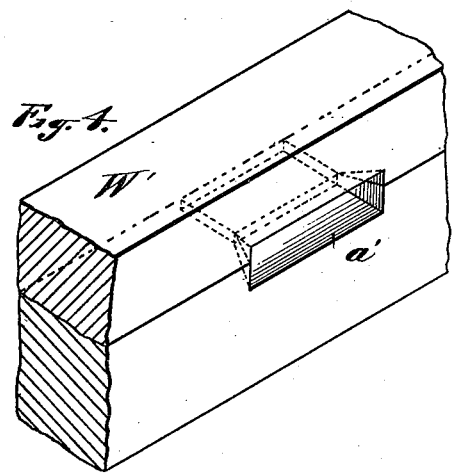
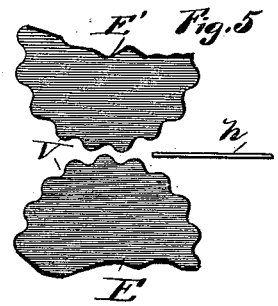
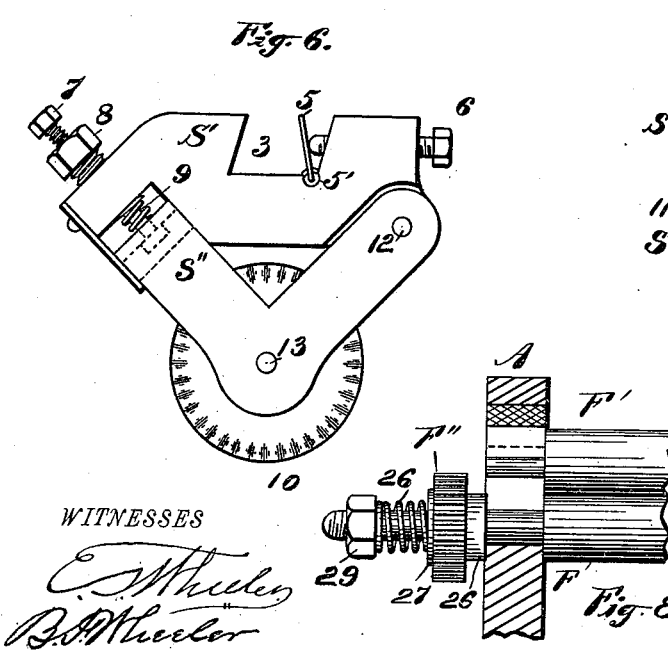
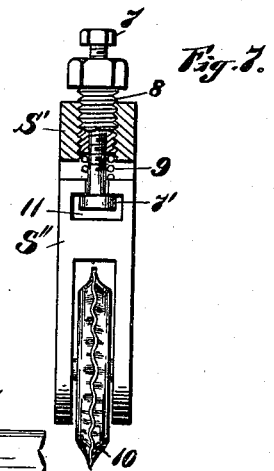
WITNESSES
INVENTOR
B. B. Morgan
Attorney.

(No Model.) 4 Sheets—Sheet 4.
B. B. MORGAN.
MACHINE FOR MAKING GARMENT STAYS.
No. 438,855. Patented Oct. 21, 1890.
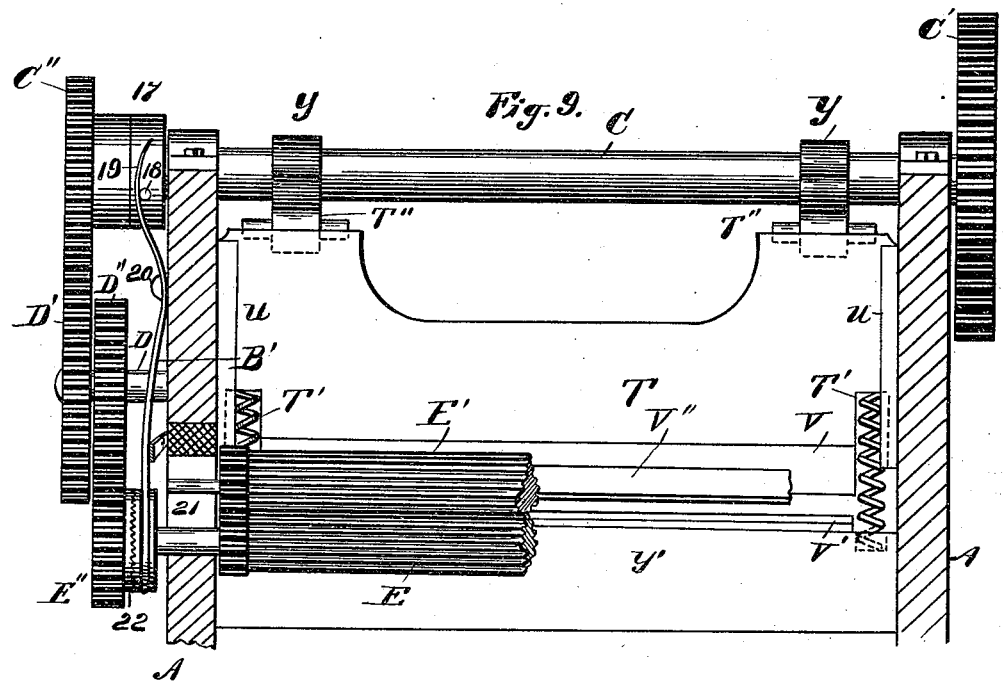
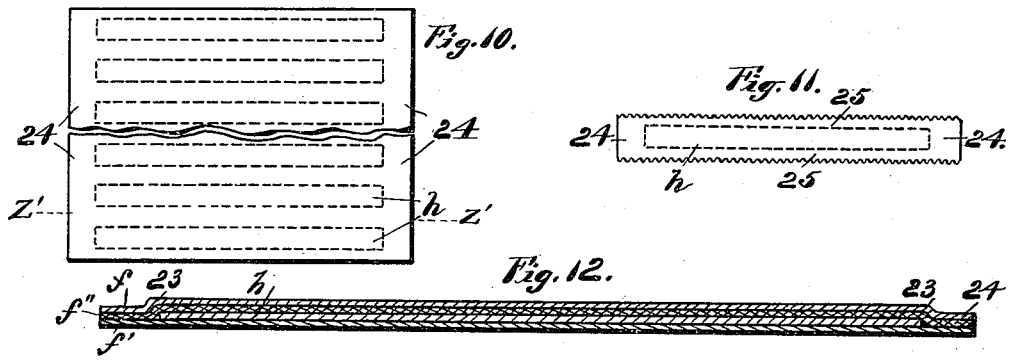
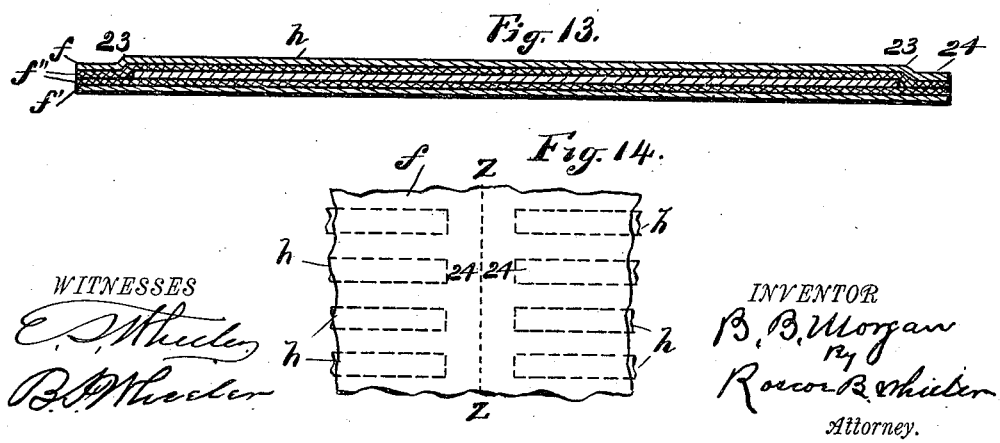
WITNESSES
INVENTOR
B. B. Morgan
By Roscoe B. Wheeler
Attorney.

UNITED STATES PATENT OFFICE.

BENJAMIN B. MORGAN, OF YPSILANTI, MICHIGAN.

MACHINE FOR MAKING GARMENT-STAYS.

SPECIFICATION forming part of Letters Patent No. 438,855, dated October 21, 1890.

Application filed May 24, 1890. Serial No. 353,035. (No model.)

*To all whom it may concern:*

Be it known that I, BENJAMIN B. MORGAN, a citizen of the United States, residing at Ypsilanti, in the county of Washtenaw and State of Michigan, have invented certain new and useful Improvements in Machines for Making Garment-Stays; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a machine for making dress or garment stays of that class known as "covered stays;" and it consists in a certain construction and arrangement of mechanism, whereby a series of flat steels or stiffening-blades are conveyed through feed-rollers to a vertically-reciprocating knife, where they are cut the desired length; thence through a series of rollers and guide-plates they are entered between two textile covering fabrics and an interposed adhesive agent—such as gutta-percha tissue or like cement. The steels and covering fabrics are then carried between heated ironing-rollers, whereby the covering fabrics are cemented together and the steels cemented in place between said fabrics. The product is then conveyed through a gang of pinking-wheels that sever the covering fabrics between the longitudinal edges of the steels or blades, leaving a projecting margin of the fabrics on each side thereof. The severed strips then pass over a printing-roller that prints thereon any desired mark or stamp, when they are discharged from the machine, after which the fabric coverings are severed by any suitable means between the ends of the steels, producing the completed stay herein illustrated, all of which will be hereinafter more fully set forth, and the essential features of the device pointed out particularly in the claims.

In the accompanying drawings, forming a part of the specification, Figure 1 is a side elevation of the machine. Fig. 2 is a vertical longitudinal section through Fig. 1. Fig. 3 is a front elevation of a set of embossing-rollers, a portion of the guide-plate located in front of said rollers being broken away. Fig. 4 is an enlarged detail of the guide-plate, showing the flared mouth of the opening thereof. Fig. 5 is an enlarged detail in cross-section of the initial feed-rollers. Fig. 6 is a side elevation of the head, in which the pinking-wheel is mounted. Fig. 7 is an edge view of the same, the head being partly in section, showing the threaded hollow sleeve and the screw-bolt passing therethrough. Fig. 8 is an enlarged detail showing the means of securing frictional contact between the second pair of feed-rollers and the gear mounted on the end thereof. Fig. 9 is a front view of a portion of the machine, the frame of which being in section and the feed-rollers and stripping-bar being broken away to show the location of parts. Fig. 10 is a plan view of a series of stays as produced by the machine before the covering fabrics are separated longitudinally between the series of blades. Fig. 11 is a view of the completed stay as cut from the card of Fig. 10. Fig. 12 is an enlarged central longitudinal section through a stay, wherein the textile covering fabrics are cemented together and the blade secured between said fabrics by a single sheet of gutta-percha tissue or like cement. Fig. 13 is a like view showing the textile covering fabrics cemented by two sheets or layers of gutta-percha tissue, one lying on each side of the blade. Fig. 14 is a diagram of the product of the machine before the covering fabrics are separated between the sides and ends of the blades.

Referring to the letters of reference, A indicates the frame of the machine.

B indicates the main shaft journaled in the end of the machine-frame, said shaft carrying on its end the drive-wheel A' and pinion-wheel A'', which meshes with the gear C', mounted on the end of the shaft C, as shown in Figs. 1 and 2. Said shaft crosses the machine-frame transversely and carries on its opposite end the pinion C''. The shaft D is journaled in one side of the frame only, and is provided with the gear-wheels D' D'', mounted on the end thereof, the gear D' meshing with the pinion C'' and the gear D'' meshing with the gears E'' F'' on the feed-rollers E and F, respectively, as clearly shown in Figs. 1 and 9. Thus the motion is conveyed to the rollers E F through the gears D' D'', and in fact to all the rollers of the machine, through the train of gears on the outside of the machine-frame, as clearly shown in Fig. 1.

It will be seen on looking at Fig. 2 that the series of rollers in the machine are arranged in pairs, one above the other; but one roller of each pair is driven by the outside gear, the motion being conveyed to the other roller through a set of gears mounted on said rollers within the frame of the machine that mesh with each other, whereby the motion of said rollers is made positive and alike. All of said series of rollers cross the machine transversely and are journaled in the sides of the frame.

Located at the front of the machine is a drum B'', over which the series of steels $h$ pass on their way to the feed-rollers E E', as shown in Fig. 2. In front of said feed-rollers the guide-plate W is located, said guide-plate having a series of openings $a$ therethrough that receive and guide the strands of steels, so as to pass them through the feed-rollers E E' at a uniform distance apart. The feed-rollers E E' are corrugated and are set so that the convexed point of one roll will register with the concave of the other, as shown at $v$ in Fig. 5. The peripheries of these rollers do not meet; but as they are connected by cut-gear their relative positions, as shown, are always retained, the object of which is to provide means for feeding into the machine in a uniform manner the various thicknesses of steels. For instance, the rollers are set sufficiently close together to feed the thinnest steels, there being always a slight space between the peripheries of the rollers. A thicker steel is simply compressed a little deeper into the cavities of the corrugations of the rollers, so that a thick and a thin steel entering the rollers side by side will be fed alike, where if smooth rollers were used the thick steels would tend to spread the rollers so that they would have no bearing on the thin steels, in which case the thick steels only would be fed into the machine. To further illustrate this matter, I will state that there are seventy-two strands of these steels fed into the machine at once, and the slightest variation in their thickness would render the machine inoperative but for the corrugated feature of the feed-rollers.

From the rollers E E' the series of steels are fed under the knife V, secured in the vertically-reciprocating head T, (shown in Figs. 2 and 9,) said head traveling between the vertical guides $u$ $u$, secured to the inner faces of the machine-frame, and is supported in its normal position by the coiled springs T' T', that rest on the cross-beam Y', located directly below the head T, the upper ends of said springs bearing against shoulders formed in the under face of said head.

Y Y are cam-heads mounted on the shaft C and bearing upon the friction-rollers T'' T'', located in the upper plane of the head T, whereby said head is depressed by the action of said cams at each revolution of the shaft C, causing a downward stroke of the knife V.

V' is a stationary knife or shear secured in the cross-beam Y', on which the series of steels lie, and which holds them up against the action of the knife V when being cut. Located just above the shear V' is a wiping-bar V''', under which the steels pass and which prevents the ends of the steels from rising as the knife V passes upward after cutting the steels, the object of said cutting being to separate the continuous steels into the proper lengths required to form the stays.

The cam-heads Y Y are provided with an abrupt offset $v'$ in the face of the cam, as shown in Fig. 2. By this arrangement the springs T' T' are enabled to act quickly after the head T has been depressed in cutting to carry the knife V upward out of the path of the steels.

It will be apparent that a continuous revolution of the rollers E E', while the steels are being cut, would feed them against the knife and cause them to buckle. To avoid this, an intermittent motion is imparted to said rollers, whereby they are stopped during the cutting of the steels, which is accomplished in the following manner, reference being had to Fig. 9.

On the shaft of the roller E the clutch 21 is splined, which adapts it to slide horizontally on said shaft while revolving therewith, the outer face of said clutch being provided with a series of teeth that are adapted to mesh with like teeth on the inner face of the hub 22 of the gear E''', that is loosely mounted on the end of said shaft. The lever B' is pivoted at 20 to the frame. Its lower end is forked and sits astride of the clutch 21, as shown by dotted lines in Fig. 1, the end of the lever lying in an annular groove in the periphery of said clutch, so that by a motion of said lever the clutch may be slid horizontally on said shaft. Said clutch 21 is normally held in contact with the toothed hub 22 of the gear E''' by means of the spring $b$, also shown in Fig. 1, which bears against the inner face of the lever B', forcing said lever outward, carrying the clutch against said hub, whereby the motion of the gear E''' is conveyed through the clutch 21 to the feed-rollers E E'''.

On the outer end of the shaft C is a collar 17, permanently secured thereto. Set in the periphery of said collar is a projecting-pin 18, that is adapted to strike the upper curved end 19 of the lever B', as the shaft C revolves, and throw it outward, which moves the lower end of said lever in, sliding the clutch 21 from contact with the hub 22, when the gear E''' will run loosely on the shaft and the feed-rollers E E' will stop. As the pin 18 passes beyond the end of the lever B', the spring $b$ will throw the clutch 21 in contact with the hub 22, causing said rollers to again revolve. The arrangement of parts is such that the pin 18 will trip the lever B' to stop the rollers E E' just as the knife V descends onto the steels, so that said rollers are stationary during the operation of cutting, said pin releasing the lever as the knife rises out of the path of the steels.

F F' and G G' are two pairs of feed-rollers that receive the severed steels from the knife V, said rollers being driven by the gears F'' G'' of Fig. 1. Located in front of each pair of said rollers is a guide-plate Z Z, having a series of slots $c\ c$ therein that receive and guide the steels, said slots being open through the bottom of the plates, whereby the pieces of steel that are too short for use may drop out of the way. The upper rollers F' G of said pairs are faced with rubber, and play very close to the peripheries of the lower rollers, which are corrugated, thus insuring a perfect feeding of the steels. As the series of steels fed into the machine extend between the pair of rollers F F' before being cut, provision must be made for stopping said rollers while the knife is cutting the steels, which is accomplished by driving said rollers by frictional contact, as shown in Fig. 8, in which the shaft of the roller F is provided with a set-collar 26. The gear F'' is loosely mounted on said shaft, and is held in frictional contact with said collar by means of the spring 28, which is confined between the washer 27 that bears against the outer face of the gear, and the nut 29 screwed onto the end of the shaft, whereby the rollers are driven until resisted by a greater force than that of the frictional contact of the gear F'' with the collar 26, which occurs when the steels are arrested by the descent of the knife V and the stoppage of the feed-rollers E E'. The drag of the steels will then stop the rollers F F', the gear F'' slipping on the shaft. By this arrangement said rollers are stopped during the actual operation of cutting only, and start on again as soon as the steels are severed, thus separating the severed portions of the steels some distance from the other portions, which do not begin again to travel until the knife V rises out of their path.

H H' are a pair of rollers driven by the gear H''.

X X' indicate two drums, located one above and the other below in the machine-frame. On the lower drum X is wound a sheet of textile fabric $f'$. On the upper drum is wound a sheet of textile fabric $f$ and a sheet of gutta-percha tissue $f''$, or like cement. Said sheets of fabric lead to and pass between the rollers H H', the sheet of gutta-percha lying between the sheets of textile fabric.

W' is a guide-plate with a series of ports therein, having the flared mouths $a'$, (see Fig. 4), that receive the steels and guide them through the rollers H H' between the sheets of textile fabric $f f'$, with the sheet of gutta-percha lying upon the upper face of the steels, the upper roller H' having a series of annular channels 14 in its periphery, as shown in Fig. 3, into which the steels and upper fabric are pressed, thereby setting the steels in place. From the rollers H H' the sheets of fabric with the interposed steels and gutta-percha pass between the heated ironing-rollers J' J'', as shown by the arrows in Fig. 2, whereby the gutta-percha tissue is melted, cementing the fabrics $f f'$ together, and securing the steels between said fabrics. The ironing-rollers are hollow, and may be heated either by a series of gas-jets running longitudinally of their interior or by steam in a manner well understood, the connection being made with the end of the rollers through the opening $r$ in the frame of the machine. (Shown in Figs. 1 and 2.) The ironing-rollers J' J'' are driven by the idler O'', through the medium of the rollers I I', as shown in Fig. 2, the rollers I I' being driven by the outside gear I'', through the idle-gear J, that meshes with the gears I'' and H'', as shown in Fig. 1.

When stopping the machine for any reason, it is necessary to throw the ironing-rollers J' J'' out of contact with the fabrics, as by remaining in contact therewith they would burn that portion of the fabric on which they rest. To accomplish this, said ironing-rollers are journaled at each end in the ends of the swinging arms P P', as shown in Fig. 2. There are four of these arms—two for supporting the ends of each of the upper and lower rollers. The arms P that support the lower rollers J'' are mounted on a rock-shaft P'', crossing the machine transversely and journaled in the sides thereof, the outer end of said shaft being provided with the lever S. (Shown in Fig. 1.) The arm supporting the upper rollers J' are pivotally mounted on the ends of the roller H', (shown in Fig. 2,) the free ends of said arms being connected to the arms P by means of the rod $t$. It will now be apparent that by raising the lever S, as shown by dotted lines in Fig. 1, the shaft P'' will rock, throwing downward the arm P, which, being connected by the rod $t$ to the free end of the arms P', will draw downward on said end, raising the opposite ends of said arms, whereby the rollers J' J'' are thrown apart and into contact with the gears O O', respectively, that mesh with the gears on the rollers. (Shown by dotted lines in Fig. 2.) The gears O O' are mounted on the shafts 1 2, and are driven independent of the machine by belting onto the pulley R on shaft 1, the motion being conveyed to shaft 2 through the chain $d$ and sprocket-wheels R' R''. (Shown in Fig. 1.) The object of throwing the ironing-rollers in contact with the revolving gears O O' when out of contact with the fabric, is to continue the revolution of said rollers, as by such revolution their uniform heat is maintained, so that when they are again thrown in contact with the fabric their peripheries will be evenly heated. From the ironing-rollers the fabrics are fed between the embossing-rollers I I', the lower roller I being smooth-faced and the upper roller I' having in its periphery a series of annular grooves similar to the grooves 14 in the roller H'. (Shown in Fig. 3.) The steels and upper fabric immediately over the steels are pressed into said grooves, thus embossing the steels in the upper fabric, while the under fabric remains flat, the embossed surface being shown at 23 in Figs. 12 and 13. From the rollers I I' the fabrics are fed over the large roller K, the steels passing between a gang of pinking-wheels 10, that are mounted on the supporting-bar K', and that cut on the periphery of the roller K, whereby the fabrics are severed longitudinally between the steels $h$, on dotted line $z'\ z'$ of Fig. 10, leaving the pinked margin 25 on each side of the steel, as shown in Fig. 11. Said roller K is driven by the gear K'', that meshes with the gear L', mounted on the shaft L, journaled in the side of the frame, said shaft also carrying the gear L'', that meshes with the gear I'', by which said gears are driven. The roller K is journaled at each end in sliding boxes $n$, (shown by dotted lines in Figs. 1 and 2,) said boxes resting on the screw-shaft $s$, carrying the thumb-wheel $m$, by the turning of which the roller may be adjusted vertically, so that the wheels 10 will have a true bearing thereon. Said wheels are journaled at 13 in the elbow S'', one end of which is loosely pivoted at 12 to the head S', (see Fig. 6,) the other end of said elbow having the recess 11, (see Fig. 7,) that is adapted to receive the head 7' of the screw 7, that passes through the sleeve 8, which is screwed into the head S', said sleeve being interiorly threaded to receive the screw 7. The spring 9 environs the lower end of the screw 7, and is confined between the end of the elbow S'' and the base of the sleeve 8. By screwing the sleeve into the head S' any desired tension may be exerted on the spring 9, and by turning the screw 7 within the sleeve 8 the head 7' of said screw may be drawn against the upper face of the recess 11, leaving an open space below said head, (shown in Fig. 7,) so that the pinking-wheels 10 will be held against the roller K by the pressure of the spring 9, permitting said wheels to yield when striking an obstruction on said roller, thereby avoiding all straining or breaking of the parts, and enabling the pinking-wheels to always cut through the fabric, though the surface of the wheels and roller K may be somewhat uneven.

In the upper portion of the head S' is a dovetail mortise 3, in which a plate 5 is hinged at 5'. The screw 6, passing through the head into said mortise, engages with said plate. The under face of the supporting-bar K' is provided with a dovetail tenon 4, (shown in Fig. 2,) that is adapted to enter the mortise 3 of the head S', when, by means of the screw 6, the plate 5 may be forced against the side of the tenon 4, thus securely fastening the wheel-heads S' to said bar; and this manner of attachment permits of the lateral adjustment of said wheels, as by loosening the screw 6, the wheel-heads S' may be readily adjusted so as to set the wheels 10 any desired distance apart. The supporting-bar K' is journaled in the sides of the frame, one end of the journal extending through the frame and carrying the lever 15. (Shown by dotted lines in Fig. 2.) By means of said lever the bar K' may be rocked to raise the wheels 10 from contact with the roller K, when the covering fabrics would not be severed between the steels, but would pass through intact, as shown by the diagram of Fig. 14, the goods being afterward severed in any desired manner.

M M' are compression-rollers driven by the outside gear M'', that meshes with the gear L''. Said rollers press the fabric together between the ends of the steels.

N N' are printing-rollers driven by the gear N''. Q indicates an inking-roller playing against the type-roller N', said type-roller being adapted to print upon the stays, as they pass from the machine, any desired mark or name. After leaving the machine, the fabrics are severed between the ends of the steels on dotted line $z\ z$ of Fig. 14, thereby forming the completed stay shown in Fig. 11, having the marginal stitching-edges 24 25 around the blade or steel.

In the manufacture of dress-stays they are made of various lengths, and to provide for cutting the steels for the different lengths of stays I employ the gears C'', D', and D'' to drive the feed-rollers of the machine, the gears C'' D' of which may be removed and others substituted to drive the rollers at an increased or decreased rate of speed, as desired. For instance, if it is desired to increase the speed of the rollers, a larger gear is substituted for the gear C'' and a smaller gear for the gear D', when the rollers will be driven at an increased speed. By substituting a smaller gear for the gear C'' and a larger gear for the gear D' the speed of the rollers will be decreased, as will be well understood. With the shaft C that operates the knife V always turning at the same rate of speed, it is evident that by increasing the speed of the feed-rollers a longer length of steels will be cut, and that by decreasing the speed of the rollers the steels will be cut in shorter lengths.

If desired, the cams Y Y, that operate the knife V, may be removed from the shaft C, when the steels will feed through the machine in continuous lengths or strands enveloped in the covering fabrics, after which they may be cut any desired length, and the exposed ends of the steels covered with a metal tip.

In some instances it may be desired to make the stays with two sheets of gutta-percha tissue, one sheet lying on each side of the steels, in which case a sheet of gutta-percha will also be fed in with the under fabric $f'$, the product being a stay with a sheet of gutta-percha tissue lying on each side of the steel between the covering fabrics, as shown in Fig. 13.

Having thus fully set forth my invention, what I claim as new, and desire to secure by Letters Patent, is—

1. In a machine for making garment-stays, the combination of a main frame, a pair of longitudinally-grooved feed-rolls, the means for guiding the steels in advance of the feed-rolls, a cutting-off knife in the rear of said feed-rolls, and the clutch mechanism to stop the feed-rolls during the act of cutting off the steels, substantially as specified.

2. In a machine for making garment-stays, the combination of a supporting-frame, a pair of longitudinally-grooved feed-rolls, a cutting-off knife in the rear of said feed-rolls, a pair of feed-rolls geared together, and the means whereby said feed-rolls are frictionally held in the rear of the cutting-off knife, substantially as shown and described.

3. In a machine for making garment-stays, the combination of a machine-frame, the pair of longitudinally-grooved feed-rolls, a cutting-off knife in the rear of said feed-rolls, a pair of feed-rolls located in the rear of the cutting-off knife, means for holding said feed-rolls frictionally together, means in front of the grooved feed-rolls for guiding the steels, and the guide-plate in the rear of the knife, said guide-plate having open slots in its under face, as and for the purposes set forth.

4. In a device for the purposes set forth, the combination of the following elements: the main frame, the longitudinally-grooved feed-rolls, the cutting-off knife, the two sets of feed-rolls in the rear of said knife, the set of feed-rolls adjacent to and in rear of the knife, means for holding said feed-rolls in frictional contact with each other, the slotted guide-plate located between said rolls and the knife, and the slotted guide-plate located between the two sets of feed-rolls, substantially as indicated.

5. In a device for the purposes set forth, the combination of the main frame, the rolls for feeding the steels located in advance of the knife, the mechanism for periodically stopping said feed-rolls, the cutting-off knife, the two sets of feed-rolls in the rear of said knife, the means for guiding the steels located in advance of the rolls for feeding the steels, and means for frictionally holding the set of feed-rolls in the rear of and adjacent to the knife, substantially as and for the purposes specified.

6. In a machine for making garment-stays, the following combined elements: the frame, the longitudinally-grooved feed-rolls, the cutting-off knife, the feed-rolls H H', the series of feed-rolls located between the rolls H H', the cutting-off knife, the series of guide-plates located between the various sets of feed-rolls, the guide-plate in advance of the longitudinally-grooved feed-rolls, and the mechanism for periodically stopping the longitudinally-grooved feed-rolls.

7. In combination with a supporting-frame, the roller K, the supporting-bar, the head S', mounted thereon, the elbow S'', having one end loosely pivoted to said head, the opposite end being adjustably coupled to the head, and having the spring 9, substantially as specified.

8. In a machine for making garment-stays, the combination of a supporting-frame, the cutting-off knife, a set of rolls to feed the series of steels to the knives, means for guiding the steels between said feed-rolls, feed-rolls for carrying the severed steels forward, two rolls carrying the textile fabrics and adhesive agent, an additional set of rolls to carry the cut steels between the textile coverings and adhesive agent, the rolls H H', and a set of heated rolls for uniting the fabrics, substantially as specified.

9. In combination with the main frame, the rolls H H', the pair of heated rolls in the rear thereof, the gear for revolving said rolls when brought together, means for separating said rolls, and a mechanism for revolving said rolls when separated, substantially as specified.

10. In a machine for the purposes specified, the combination of a supporting-frame, the roller K, adjustably mounted therein, the supporting-bar K', located pivotally in the frame above the roller K, the series of pinking-wheels adjustably located on said supporting-bar, and the lever 15 for actuating said supporting-bar, substantially as and for the purposes specified.

11. In a machine for making garment-stays, the main frame, the pair of hollow heated rolls, the arms P P', coupled to said rolls, said arms being pivoted to the machine-frame, the rod $t$ attached to said arms, and the lever S to actuate said arms, substantially as set forth.

In testimony whereof I affix my signature in presence of two witnesses.

BENJAMIN B. MORGAN.

Witnesses:
E. S. WHEELER,
R. B. WHEELER.